US008279486B2

(12) United States Patent
Awata (10) Patent No.: US 8,279,486 B2
(45) Date of Patent: Oct. 2, 2012

(54) INFORMATION PROCESSING APPARATUS (75) Inventor: Satoshi Awata, Nara (JP)

(73) Assignee: Sharp Kabushiki Kaisha, Osaka-Shi, Osaka (JP)

(*) Notice: Subject to any disclaimer, the term of this patent is extended or adjusted under 35 U.S.C. 154(b) by 484 days.

(21) Appl. No.: 12/423,978

(22) Filed: Apr. 15, 2009

(65) Prior Publication Data
US 2009/0279113 A1 Nov. 12, 2009

(30) Foreign Application Priority Data

May 12, 2008 (JP) ................. 2008-124452

(51) Int. Cl.
H04N 1/60 (2006.01)
G06F 3/12 (2006.01)

(52) U.S. Cl. ........ 358/1.9; 358/1.1; 358/1.13; 358/1.15; 715/735

(58) Field of Classification Search ................. 358/1.1, 358/1.9, 1.13, 1.15, 468; 715/700, 734, 736
See application file for complete search history.

(56) References Cited

U.S. PATENT DOCUMENTS

| 5,854,693 | A | * | 12/1998 | Yoshiura et al. | 358/468 |
| 6,864,991 | B1 | | 3/2005 | Takahashi | |
| 7,102,783 | B2 | | 9/2006 | Morooka et al. | |
| 7,830,534 | B2 | * | 11/2010 | Tomita | 358/1.13 |
| 7,904,816 | B2 | * | 3/2011 | Sakai | 715/734 |
| 7,984,120 | B2 | * | 7/2011 | Yoshida | 709/220 |
| 2005/0141007 | A1 | * | 6/2005 | Shirai et al. | 358/1.13 |
| 2006/0026600 | A1 | * | 2/2006 | Yoshida | 719/310 |
| 2006/0248476 | A1 | * | 11/2006 | Yamada | 715/835 |
| 2007/0171450 | A1 | * | 7/2007 | Yoshida | 358/1.13 |
| 2007/0229879 | A1 | * | 10/2007 | Harmon et al. | 358/1.15 |
| 2007/0229896 | A1 | * | 10/2007 | Fujimori et al. | 358/1.16 |
| 2008/0115059 | A1 | * | 5/2008 | Sakai | 715/700 |
| 2008/0180699 | A1 | * | 7/2008 | Selvaraj | 358/1.1 |
| 2008/0180712 | A1 | * | 7/2008 | Selvaraj | 358/1.13 |
| 2008/0180726 | A1 | * | 7/2008 | Selvaraj | 358/1.15 |
| 2008/0259390 | A1 | * | 10/2008 | Murase | 358/1.15 |
| 2009/0059273 | A1 | * | 3/2009 | Tomita | 358/1.15 |
| 2009/0237730 | A1 | * | 9/2009 | Tokunaga et al. | 358/1.15 |
| 2010/0157368 | A1 | * | 6/2010 | Harmon et al. | 358/1.15 |
| 2010/0180206 | A1 | * | 7/2010 | Silva et al. | 715/744 |
| 2010/0188700 | A1 | * | 7/2010 | Fujimori et al. | 358/1.15 |
| 2011/0126112 | A1 | * | 5/2011 | Sakai | 715/736 |
| 2011/0235114 | A1 | * | 9/2011 | Saitoh et al. | 358/1.15 |

FOREIGN PATENT DOCUMENTS

JP 04-172496 6/1992
(Continued)

Primary Examiner — Kimberly A Williams
(74) Attorney, Agent, or Firm — Edwards Wildman Palmer LLP; David G. Conlin; Stephen D. LeBarron (57) ABSTRACT A PC is provided with a display control portion for displaying, in a setting dialogue box in which setting items corresponding to each function are provided in order to perform an operation setting for each function of a plurality of connected devices, illustrations of the plurality of devices, a device information storage portion for storing a mounted function for each of the devices, a detecting portion for detecting that a pointer indicates the setting item, and a device determination portion for determining the device mounted with a function corresponding to the detected setting item. The display control portion performs a display of an illustration of a function mounted device specified by the device determination portion of the plurality of devices in a different form from illustrations of other devices.

3 Claims, 9 Drawing Sheets

FOREIGN PATENT DOCUMENTS

| | | |
|---|---|---|
| JP | 07-210477 | 8/1995 |
| JP | 2000-298540 | 10/2000 |
| JP | 2003-091385 | 3/2003 |
| JP | 2003-162351 | 6/2003 |
| JP | 2003-241876 | 8/2003 |
| JP | 2004-005697 | 1/2004 |

\* cited by examiner

INFORMATION PROCESSING APPARATUS

CROSS-NOTING PARAGRAPH

This Non-provisional application claims priority under 35 U.S.C. §119(a) on Patent Application No. 2008-124452 filed in JAPAN on May 12, 2008, the entire contents of which are hereby incorporated herein by reference.

FIELD OF THE INVENTION

The present invention relates to an information processing apparatus that displays a dialogue box provided with setting items corresponding to various functions in order to set operation functions of a plurality of devices which are communicatively connected to the apparatus, and that instructs a setting value to the displayed dialogue box for each device to be set.

BACKGROUND OF THE INVENTION

When a peripheral device connected to an information processing apparatus such as a personal computer (PC) is operated by the PC, generally, software called a driver incorporated in the PC is used so that the processing condition in the peripheral device can be set by the driver. For example, when printing processing for image data created by the PC is performed by a printer connected to the PC, a printer driver which is one type of drivers is used to input (set) setting values to various setting items, such as the number of printing copies and a print form (for example, whether or not to perform staple processing), and to set the processing condition (printing condition).

As a specific operation in inputting values to various setting items on the printer driver, first, a user activates, for example, the printer driver and makes the PC to display a dialogue box of "property" on its display portion. Whereby, for example, when the WindowsXP (registered trademark) by Microsoft Corporation is used as an operating system of the PC, a dialogue box for printer setting is displayed on the above-described display portion as the dialogue box. Then, the user uses an input apparatus such as a pointing device to input desired setting values to the various setting items on the above-described dialogue box.

Moreover, in recent years, an environment in which a plurality of printers are connected to a PC through a network or the like is not uncommon. In such an environment, printers having different functions, respectively, are mixed in the plurality of printers used.

When performing setting for a plurality of printers having different functions, respectively, for example, settings have been conventionally performed individually through a setting dialogue box of a printer driver corresponding to each of the printers. Moreover, Japanese Laid-Open Patent Publication No. 2003-91385 discloses a setting method in which, with respect to a plurality of printers, common setting items are collectively set through a setting dialogue box of one group printer driver and not-common setting items are individually set through a setting dialogue box of each of the printer drivers (member drivers).

The conventional dialogue box of a printer driver is often provided with, even when a printer provided with the driver is not mounted with a predetermined function, a setting item for the function. This is because the printer can be mounted with the function optionally. Moreover, in this case, when the printer is not mounted with the predetermined function, a setting item of the function is often displayed in grayout so as not to allow setting in a setting dialogue box.

Here, the following condition is assumed. The condition is that three or more printers are communicatively connected to one PC and only one printer has a staple function. In this condition, when intending to perform printing with the staple function set to be valid, conventionally, the followings (1) and (2) are considered.

(1) In the case where settings are individually performed through a setting dialogue box of a printer driver corresponding to each printer:

In a setting dialogue box of a printer driver, when a setting item for a staple function is provided regardless of presence of the staple function and is displayed in grayout depending on whether or not the function is mounted as described above, it is possible to recognize whether or not a printer to be set currently is mounted with the staple function. However, it is impossible to recognize which printer is mounted with the staple function, thus it is necessary to switch the printers (that is, switch printer drivers) until the printer is found, which generates the labor. In addition, in the setting dialogue box of a printer driver, also in a case where a setting item for the staple function is provided only when the function is mounted, it is still impossible to recognize which printer is mounted with the staple function.

(2) In the case where a setting is performed with a setting method as disclosed in Japanese Laid-Open Patent Publication No. 2003-91385:

When a setting item for a staple function is provided regardless of presence of the staple function in a setting dialogue box of a printer driver (member driver), it is possible to set the staple function to be valid using a group driver and instruct printing, but it is impossible to recognize whether or not the selected printer has the staple function until the printing is performed. On the other hand, in a case where a setting item for a staple function is provided in the setting dialogue box of the member driver only when the staple function is mounted, it is also impossible to recognize which printer is mounted with the staple function and it is necessary to switch printers until the corresponding printer is found.

As described above, when intending to set a setting item for a desired function in a setting dialogue box in the conventional technology, it takes time to recognize which device is mounted with the function.

SUMMARY OF THE INVENTION

An object of the present invention is to provide an information processing apparatus for setting a function of a connected device, that displays a setting dialogue box corresponding to a function so as to allow a user, in setting a predetermined function to a device, to recognize a device mounted with the function.

Another object of the present invention is to provide an information processing apparatus that displays, in order to perform an operation setting for each of functions of a plurality of devices which are communicatively connected, a setting dialogue box in which a setting item corresponding to each of the functions is provided, and that has a pointer for instructing a setting value of the setting item, comprising: a display control portion for displaying illustrations of the plurality of devices in the setting dialogue box; a mounted function storage portion for storing a mounted function for each of the devices; a detecting portion for detecting that the pointer indicates the setting item; and a determination portion for determining the device mounted with a function corresponding to the setting item detected by the detecting portion, wherein the display control portion performs a display of an illustration of the device determined by the determination portion among the plurality of devices in a different form from illustrations of other devices.

Another object of the present invention is to provide the information processing apparatus, wherein, in the display in the different form, an animation display is performed for either a display of the illustration of the device determined by the determination portion among the plurality of devices or a display of the illustrations of other devices.

Another object of the present invention is to provide the information processing apparatus, wherein a size of the illustration is gradually changed in the animation display.

Another object of the present invention is to provide the information processing apparatus, wherein, when the pointer is moved from the setting item while the animation display is performed, the animation display is stopped.

Another object of the present invention is to provide the information processing apparatus, wherein, in the display in the different form, a background color of the illustration of the device determined by the determination portion among the plurality of devices is displayed differentially from background colors of the illustrations of other devices.

Another object of the present invention is to provide the information processing apparatus, wherein, in the display in the different form, the illustration of the device determined by the determination portion among the plurality of devices is displayed and the illustrations of other devices are not displayed.

PREFERRED EMBODIMENTS OF THE INVENTION

Figure 1:
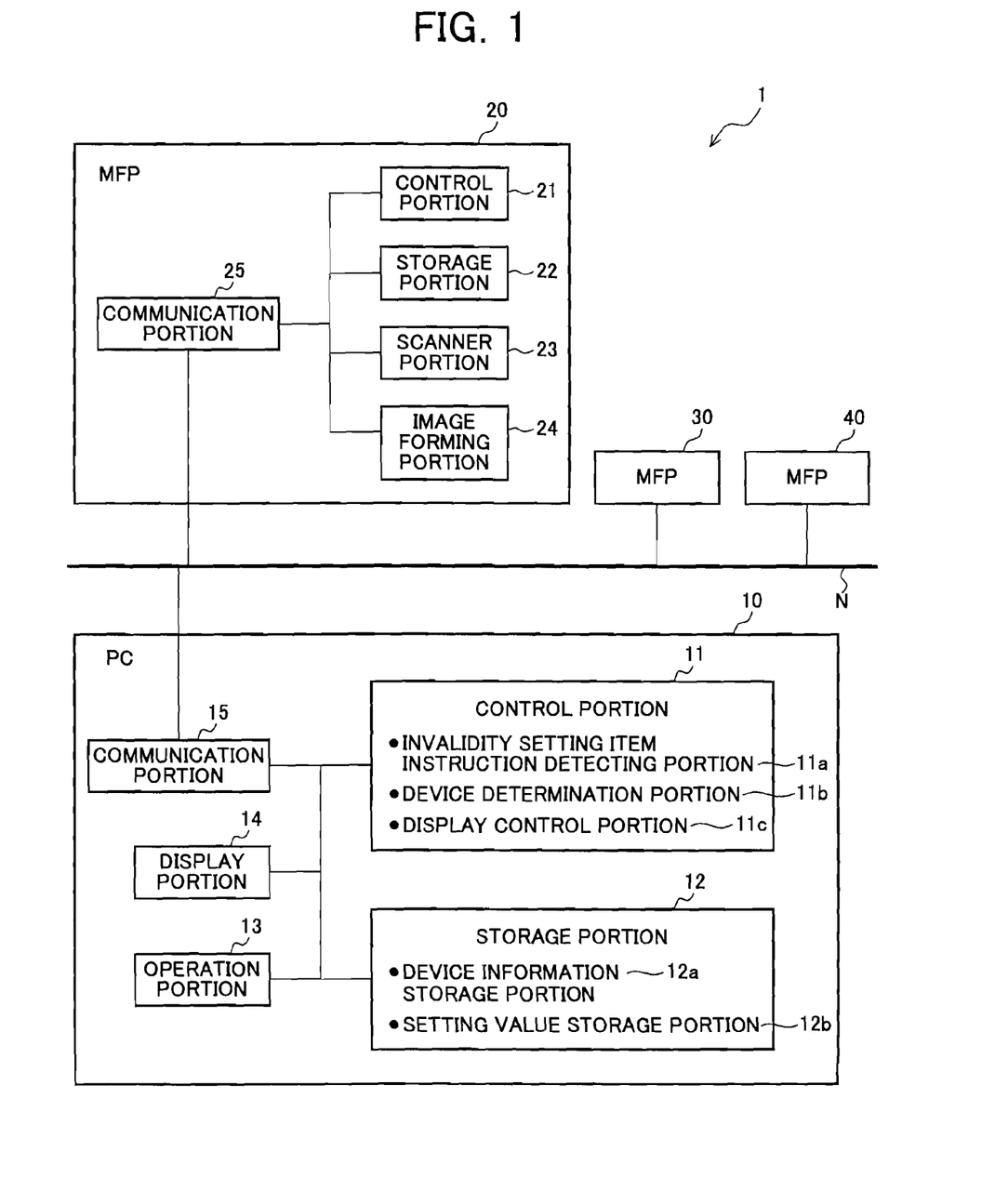
FIG. 1 is a view showing a structural example of a system in which an information processing apparatus of the present invention is used.

FIG. 1 is a view showing a structural example of a system in which an information processing apparatus of the present invention is used. A system 1 of FIG. 1 is configured so that a PC 10 as an example of the information processing apparatus according to the present invention, multi-function peripherals (MFPs) 20, 30, and 40 are connected through a network N. Each of the MFPs 20, 30, and 40 is an example of peripheral devices connected to the PC 10.

Prior to description for the PC 10, the MFPs 20, 30, and 40 will be described.

The MFP 20 is a multi-function peripheral having functions of, for example, a printer apparatus, a network scanner apparatus, a copier, and the like. The MFP 20 is provided with a control portion 21 constituted by a CPU that performs calculation, a RAM that stores temporal information accompanied by the calculation, and the like.

Connected to the control portion 21 are a storage portion 22 that stores a control program for controlling the MFP 20, a scanner portion 23 that reads a document image recorded on a recording sheet and generates image data, and an image forming portion 24 that forms the image data on a recording sheet.

The MFP 20 is capable of receiving image data transmitted from the PC 10 by a communication portion 25 and forming an image by the image forming portion 24 based on the received image data. In this way, the MFP 20 functions as a printer apparatus. Note that, the MFP 20 also functions as a copier, a network scanner apparatus, a remote copying apparatus, and the like, with each of the above-described portions.

Moreover, the MFP 20 is configured so that the control portion 21 is capable of holding status information (for example, information on running-out of toners, information on running-out of sheets, information on running-out of staples, information on whether or not there is a document on a scanner portion, and the like) of the MFP 20.

Each of the MFPs 30 and 40 is provided with a control portion, a storage portion, a scanner portion, an image forming portion, and a communication portion, which are similar to the control portion 21, the storage portion 22, the scanner portion 23, the image forming portion 24, and the communication portion 25 of the MFP 20, and are therefore not shown in the figure, with description thereof omitted.

In addition, herein, the image forming portion of the MFP 30 has a staple unit that staples a group of recording sheets having images formed thereon and the like, the image forming portion of the MFP 40 has the above-described staple unit and a punch unit that performs punching processing to a group of recording sheets having images formed thereon, and the image forming portion 24 of the MFP 20 has neither of the units. Moreover, only the MFP 40 has a color printing function.

Subsequently, the PC 10 will be described. The PC 10 operates the MFP (20, 30 or 40) connected to the PC 10, in which the processing condition in operating the MFP can be set using user interfaces (UIs) of various drivers. The following description shows an example when the PC 10 uses a printer setting dialogue box constituting a UI of a printer driver to set the printing condition in operating the MFP (20, 30 or 40) as a printer.

The PC 10 is provided with a control portion 11, a storage portion 12, an operation portion 13, a display portion 14, and a communication portion 15.

The control portion 11 is constituted by a CPU that performs calculation and the like, and controls the entire functions of the PC 10, including a display function for a printer setting dialogue box (hereinafter, abbreviated as a setting dialogue). The storage portion 12 stores various information, and is constituted by a RAM that stores temporal information accompanied by the above-described calculation, a hard disc that stores other information (for example, a program), and the like.

The operation portion 13 is configured by input apparatuses such as, for example, a keyboard and various pointing devices (for example, a mouse and a track ball), and transmits an operation from a user to the control portion 11. The display portion 14 is an output apparatus for presenting various information to the user, and is configured by, for example, a liquid crystal display and the like. The communication portion 15 causes the PC 10 to transmit/receive information to/from the outside, and is capable of being connected to a communication network N. The communication portion 15 allows the exchange information between the PC 10 and the MFPs 20, 30 and 40 through the communication network N.

Note that, the control portion 11 of the PC 10 has a graphical device interface (GDI), a printer driver, and a print manager, as the configuration of a module to cause the MFP to execute a print operation based on image data transmitted from an application installed in the PC 10. That is, the image data is transferred from the application to the GDI, the printer driver, and the print manager so that the image data is transferred from the print manager to the MFP to execute the print operation. In this case, the application transmits a function of the GDI and the GDI converts the transferred function to a function of a device drive interface (DDI). In addition, the printer driver generates image data for a printer operation from the function of the DDI. The print manager transmits the image data transferred from the printer driver or performs management of jobs. In addition, the printer driver has a function of transmitting information of the printer and the print manager to the GDI and the application, providing the UI so that the user can change a setting for the printer driver, or holding a value set by the user.

The control portion 11 functions as an invalidity setting item instruction detecting portion 11a, a device determination portion 11b, a display control portion 11c, and the like in the processing of the printer driver in the PC 10, and the storage portion 12 functions as a device information storage portion 12a, a setting value storage portion 12b, and the like. Functions of each of the portions are as follows.

The device information storage portion 12a stores peripheral devices (MFPs) that are communicatively connected to the PC 10 and stores functions mounted in each of the MFPs as mounted function information for each MFP. To each of the MFPs, functions can be added, and when a function is added, the above-described mounted function information is rewritten. Moreover, the device information storage portion 12a stores an MFP that is set as a so-called default printer, or an MFP to be set (being selected) currently as an MFP to which changing of a setting and the like are actually performed to execute printing processing.

Figure 2:
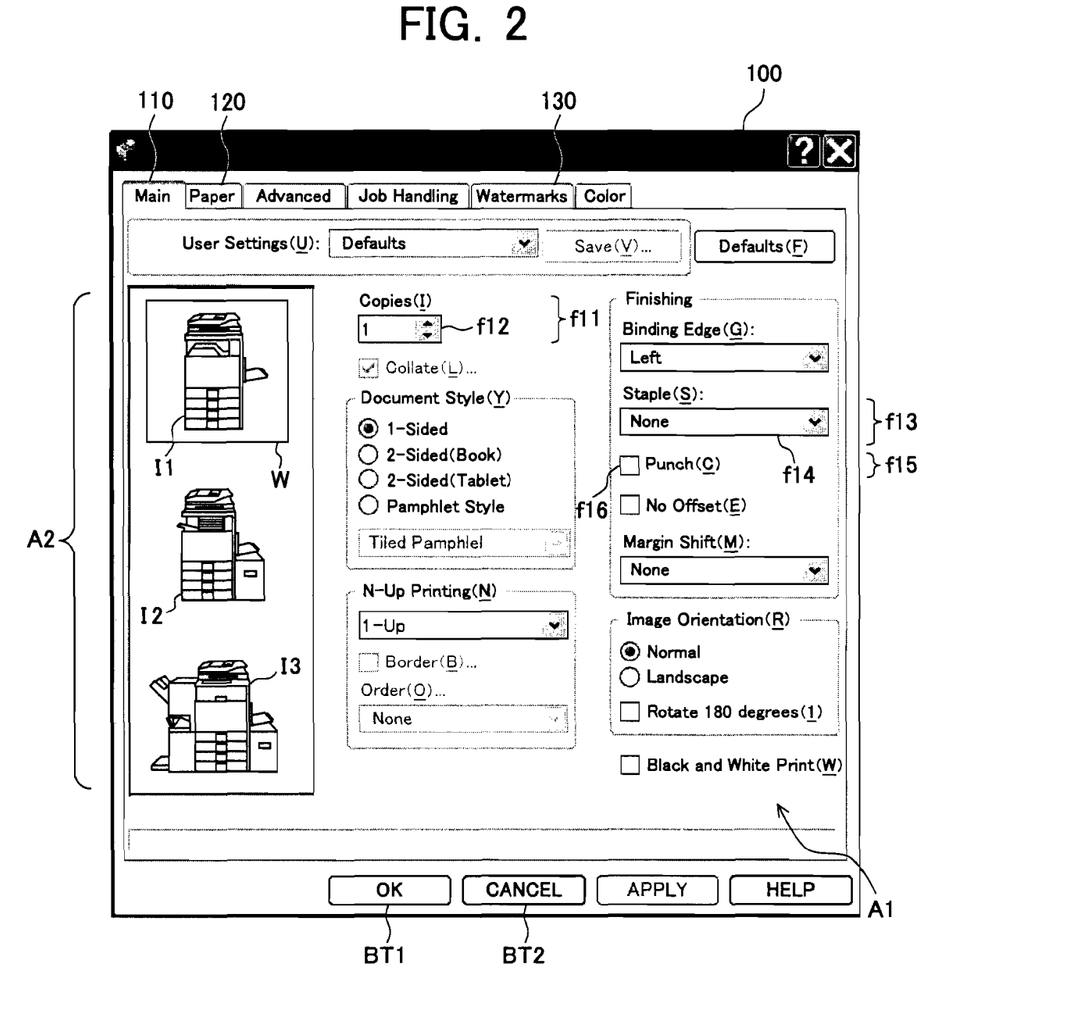
FIG. 2 is a view showing a display example of a setting dialogue according to the present invention.
Figure 3:
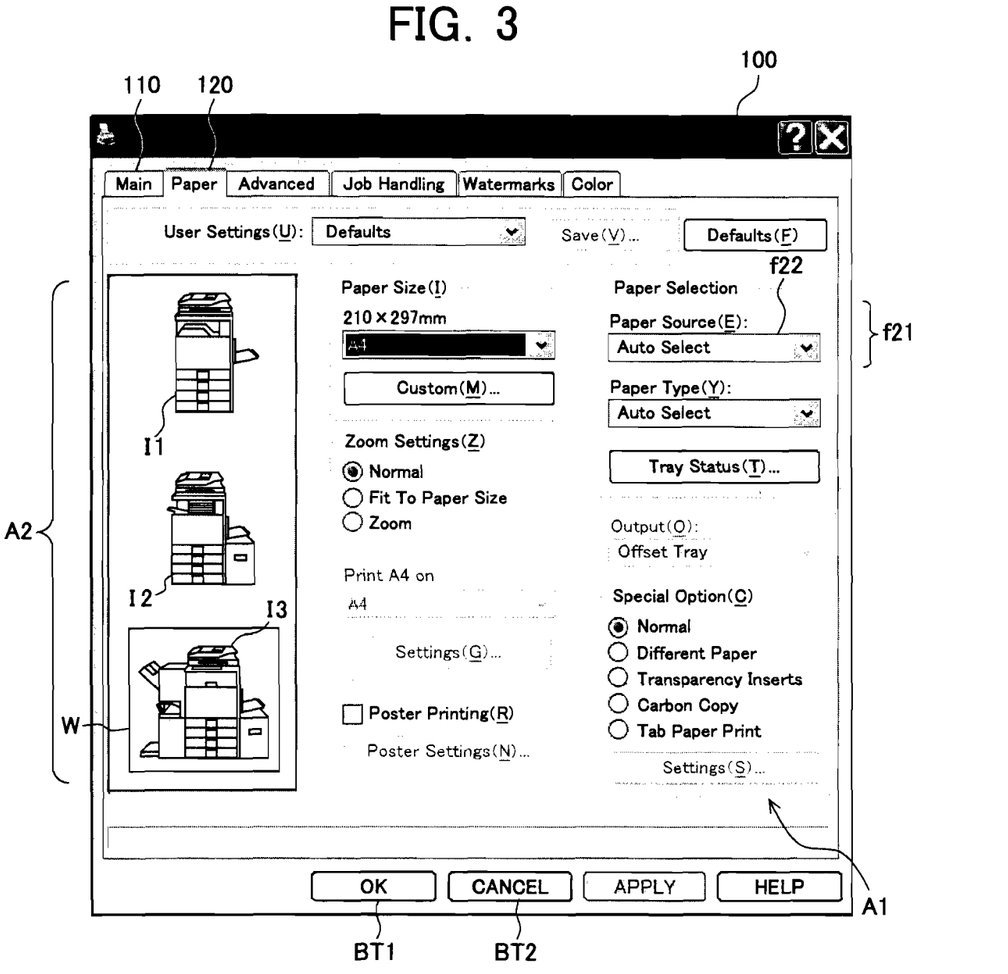
FIG. 3 is a view showing a display example of a setting dialogue according to the present invention.
Figure 4:
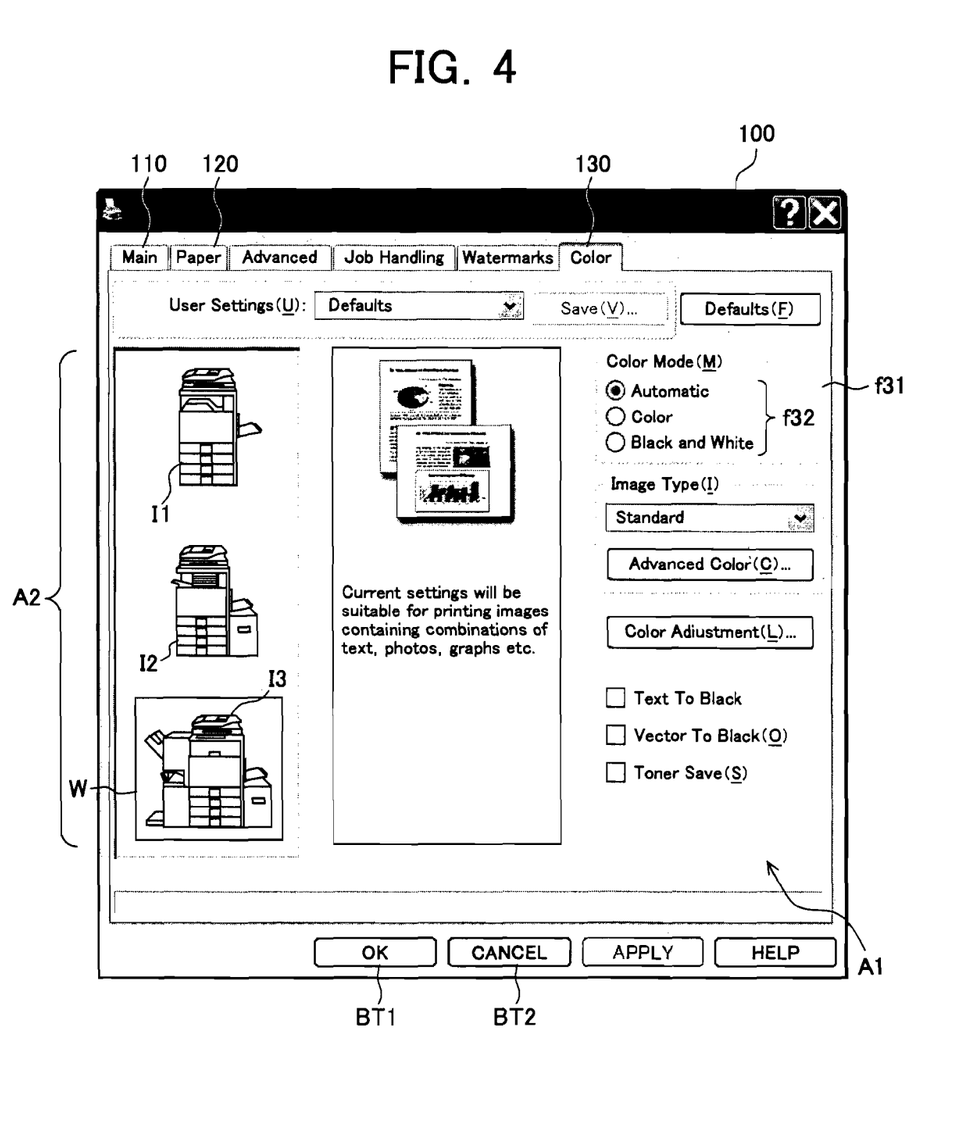
FIG. 4 is a view showing a display example of a setting dialogue according to the present invention.

The setting value storage portion 12b stores a selected state in a setting dialogue (UI) and stores a setting value for each setting item of the setting dialogue. For example, when the setting dialogue is started for the first time after the PC 10 is started, the control portion 11 reads initial setting values for various setting items from any of the storage portions, which are stored in the setting value storage portion 12b. Thereafter, when a user inputs a desired setting value to a desired setting item through the operation portion 13 to change the setting value, the setting value storage portion 12b stores the changed setting value with respect to the changed setting item. Note that, the initial setting value may be a default value at the time of factory shipment, or a value set by the user. The setting value storage portion 12b stores, for example, "Copies": "1", "Staple": "None", "Punch": "Not-selected", "Paper Source": "Auto Select", "Color": "Automatic", and the like, as setting values for each setting item. FIGS. 2 to 4 are views showing a display example of a setting dialogue in a state where various setting items have initial setting values.

Here, description will be given for a setting dialogue according to the present invention. For example, as the setting dialogue, six kinds of cards including "Main", "Paper" and "Color" are prepared. FIGS. 2 to 4 show a state where a "Main" card 110 is displayed, a state where a "Paper" card 120 is displayed, and a state where a "Color" card 130 is displayed, respectively. For example, in an initial setting, the "Main" card 110 is set as a card that is displayed at first when the setting dialogue is displayed, and subsequently, a displayed card is changed when a user clicks a tab of the "Paper" card 120 or the "Color" card 130 or the like with a mouse.

In addition, each of the cards 110, 120 and 130 has an area for setting value input A1 in which input of a setting value to a setting item is received from a user and an area for illustration display A2 in which an illustration of a settable MFP is displayed.

The area for setting value input A1 in each of the cards 110, 120 and 130 has setting value input fields in which a setting value to a setting item is input or selected with respect to each of the setting items.

In the area for setting value input A1 in the "Main" card 110, for example as shown in FIG. 2, a setting value input field f12 is provided for a display area f11 relating to the setting item "Copies". In the setting value input field f12, the number of printing copies is set. In addition, a setting value input field f14 is provided for a display area f13 relating to the setting item "Staple". In the setting value input field f14, the number of stapling is set, and, for example, is selected from a list of "None", "1 staple", "2 staples" and the like. Further, in a display area f15 relating to the setting item "Punch", a check box f16 is provided as a setting value input field, and this check box f16 is to validate a punch function.

In the area for setting value input A1 in the "Paper" card 120, for example as shown in FIG. 3, a setting value input field f22 is provided for a display area f21 relating to the setting item "Paper source". In the setting value input field f22, a tray as a paper feed source for a sheet to be used for printing is set, and can be selected from a list of "Auto Select", "Tray 1", and the like.

In the area for setting value input A1 in the "Color" card 130, for example as shown in FIG. 4, a setting value input field f32 is provided for a display area f31 relating to the setting item "Color". In the setting value input field f32, whether or not to enable execution of color printing is set, in which "Automatic", "Color", and "Black and White" are prepared as a choice. Note that, herein, it is assumed that, when the "Color" is selected, a setting item for color printing is set to be valid, and when other choices are selected, a setting item for color printing is set to be invalid.

Moreover, in the area for illustration display A2 in each of the cards 110, 120 and 130, as described above, illustrations (in the present example, illustrations schematically showing overviews of devices) I1, I2 and I3 of the MFPs 20, 30 and 40 are displayed as settable MFPs. In addition, a (black) rectangular frame W is displayed in the area for illustration display A2. The MFP corresponding to the illustration surrounded by the rectangular frame W is an MFP to be set, and in the example of FIG. 2, the MFP 20 is the MFP to be set. Note that, the area for illustration display A2 is used to select the MFP to be set, and for example, when a click operation is made to the illustration I3 in a setting dialogue box 100 in the state of FIG. 2, the MFP to be set is changed from the MFP 20 corresponding to the illustration I1 to the MFP 40 corresponding to the illustration 3. Note that, when four settable MFPs are connected to the PC 10, of course, illustrations of these four MFPs are displayed in the above-described area for illustration display A2.

Moreover, each of the cards 110, 120 and 130 has an "OK" button BT1 and a "Cancel" button BT2. It is possible that, with a use of the setting dialogue 100, a user inputs a setting value to each of the above-described various setting value input fields, changes a setting value for a setting item, and changes the printing condition composed of a group of setting items. However, the printing condition has not been decided yet and will be decided first when the "OK" button BT1 is pressed. When having been decided, for example, the printing condition stored in the storage portion 12 is rewritten, and when the user then presses the "OK" button in a printing dialogue, the user is capable of causing the MFP to be set to perform printing for image data under the changed printing condition.

The invalidity setting item instruction detecting portion 11a of the control portion 11 detects that a setting item corresponding to a function (at least a setting item corresponding to a function, the mounted state of which can be different for each device) is indicated, and in the present example, particularly detects a setting item corresponding to a function that is set to be invalid. The invalidity setting item instruction detecting portion 11a detects that a user indicates (points) a setting item corresponding to a function that is set to be invalid with a pointer (for example, a mouse pointer) in the setting dialogue, and determines possibility of changing a setting to the setting item. Specifically, when there is the mouse pointer on a display area of a setting item, the invalidity setting item instruction detecting portion 11a determines whether or not a function corresponding to the setting item is set to be invalid (non-selected) with reference to a setting value of the setting item stored in the setting value storage portion 12b. When the function is set to be invalid, the invalidity setting item instruction detecting portion 11a specifies the function corresponding to the setting item indicated by the pointer.

The device determination portion 11b determines whether or not the MFP to be set currently is mounted with the function specified by the invalidity setting item instruction detecting portion 11a with reference to the device information storage portion 12a. When the MFP to be set currently is mounted with the specified function, no particular processing is performed. Alternatively, when the MFP to be set currently is not mounted with the above-described specified function, a mounted device (MFP) is determined and specified as a function mounted device.

The display control portion 11c controls a display screen displayed on the display portion 14 of the PC 10, and is capable of controlling so that respective illustrations of a plurality of devices are displayed within the setting dialogue box. Further, the display control portion 11c is capable of displaying an illustration of a device specified by the device determination portion 11b in a different display form from illustrations of other devices not to be set. The display control is performed in this way, thus, when an MFP to be set is not mounted with a desired function, a user who uses the PC 10 is capable of recognizing an MFP mounted with the desired function.

Relating to the different display form, the display control portion 11c is capable of displaying a display part of an illustration of an MFP specified as the function mounted device by the device determination portion 11b by animation.

Next, description will be given for an example of an animation display in the present invention, with reference to FIGS. 5A to 5C.

For the animation display in the present invention, the display control portion 11c prepares several patterns of UI images to be used for each animation display. These UI images allow a user to confirm, while an animation display is made in the setting dialogue, that the animation display is being performed.

Figure 5A:
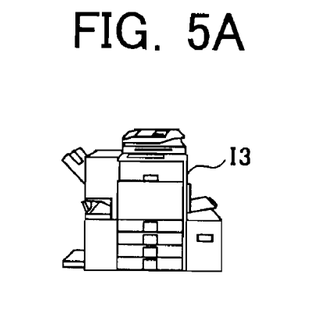
FIGS. 5A through 5C are views illustrating an example of an animation display for an illustration of an MFP in an illustration display area in a setting dialogue.
Figure 5B:
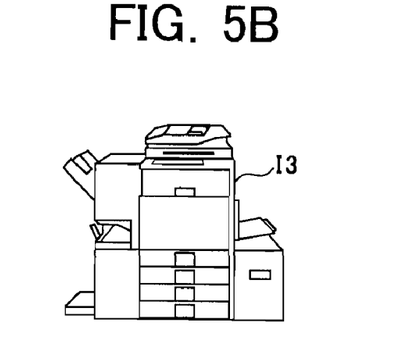
Figure 5C:
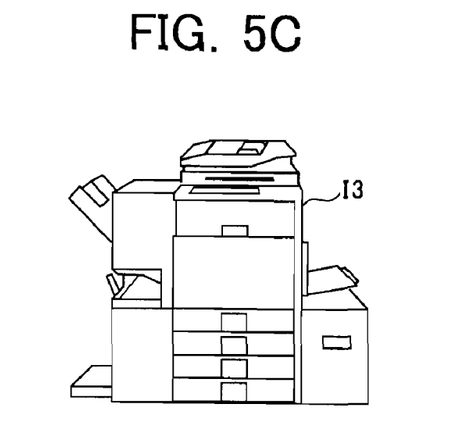

For example, in the setting dialogue 100, when the illustration I3 of the device in the area for illustration display A2 is displayed by animation, a small image of the illustration I3 as shown in FIG. 5A, a medium-sized (normal-sized) image of the illustration I3 as shown in FIG. 5B, and a large image of the illustration I3 as shown in FIG. 5C are prepared. A display order of the above-described three images in the animation display in the setting dialogue 100 is also decided, and for example, the display is made in the order of FIG. 5A, FIG. 5B, FIG. 5C, FIG. 5B, FIG. 5A, FIG. 5B and so on. The animation display is performed such that the above-described images are displayed in this order and for an arbitrarily determined display time of each of the images in the area for illustration display A2.

Moreover, the case where the animation display as shown in FIG. 5A through FIG. 5C is performed is the case where, for example, the MFP 20 is a setting object, "Non-Selected" is set to the setting item "Punch" in the "Main" card 110 of the setting dialogue 100 (see FIG. 2), and the pointer is on the display area f15 of the setting item. Whereby, even when the MFP 20 to be set is not mounted with the punch function desired by a user, the MFP 40 mounted with the punch function can be easily recognized, thus allowing the user to switch the MFP to be set to the MFP 40 and to perform printing using the punch function from the MFP 40 smoothly.

In addition, as another example of the case where the animation display, as shown in FIG. 5A through FIG. 5C, of a display part of the illustration of the MFP 40 is made, there is a case where the MFP 20 that has no color printing function is a setting object, "Automatic" or "Black and White" is set to the setting item "Color" in the "Color" card 130 of the setting dialogue 100 (see FIG. 4), and the pointer is on the display area f31 of the setting item. Whereby, even when the MFP 20 to be set is not mounted with the color printing function desired by the user, the MFP 40 mounted with the color printing function can be easily recognized.

Note that, a method for the animation display is not limited to the above. For example, a background color of an illustration of an MFP specified as a function mounted device may be changed to notify a user. A color of the illustration may be changed, or the illustration may be flashed or blinked.

Moreover, the animation display in which not an illustration of a function mounted device but illustrations of other devices are caused to be deleted (or are deleted) may be performed. What is important is to notify a user of a distinction between a mounted device and not-mounted devices. Note that, the display time may be selectable appropriately.

Next, description will be given for an example of display processing for a setting dialogue by the PC 10 having the structure as described above, with reference to the flowchart of FIG. 6.

Figure 6:
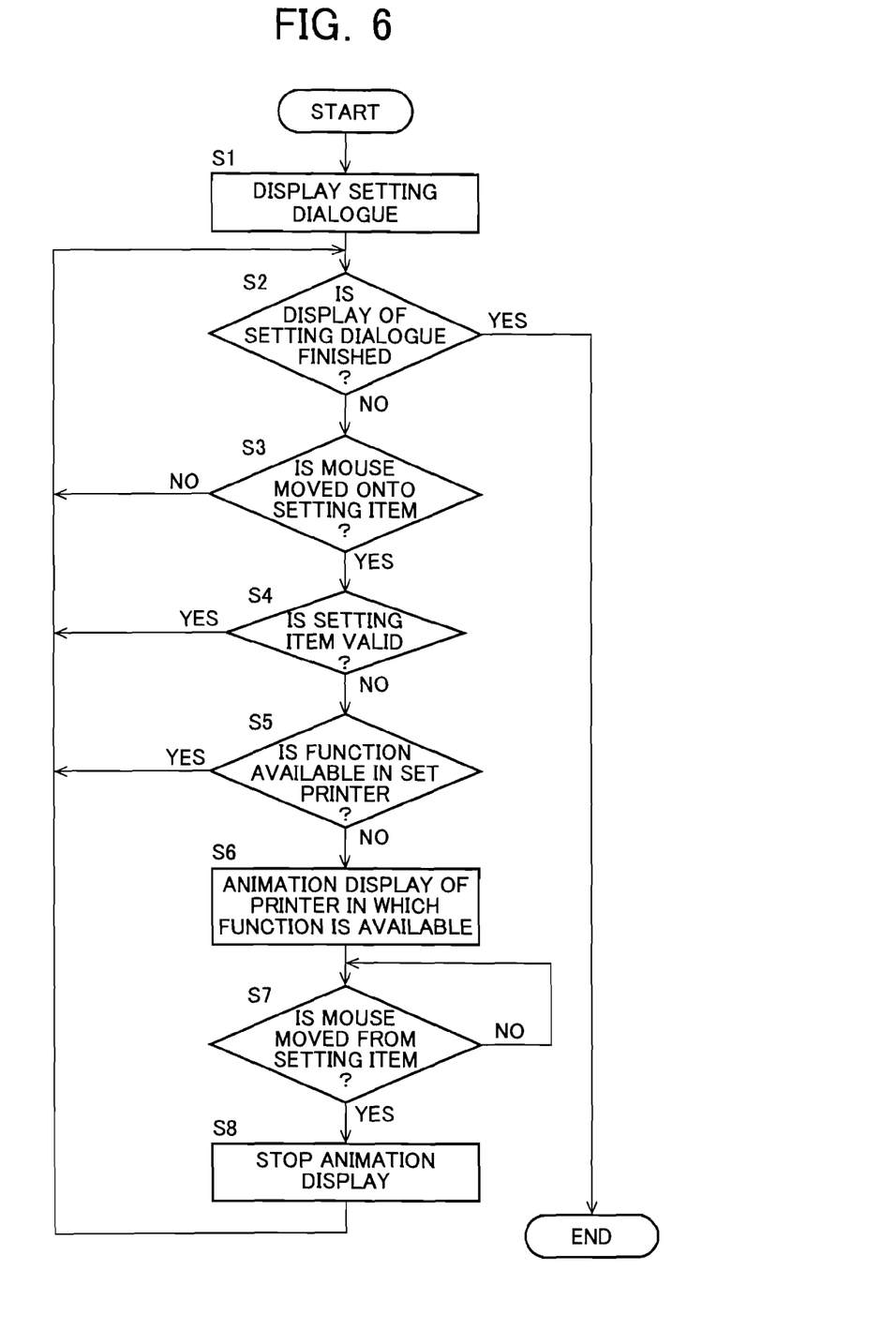
FIG. 6 is a flowchart illustrating an example of display processing for a setting dialogue of the present invention.

When a predetermined operation (an operation of starting a printer driver such as instruction of printing for an image file, an operation of pressing a "Property" button or the like) is performed through the operation portion 13 by a user, the display control portion 11c displays a setting dialogue on the display portion 14 based on a setting value for each setting item, information of an MFP connected to the PC 10 stored in the device information storage portion 12a, and the like (step S1).

At subsequent step S2, it is determined whether of not the "OK" button BT1 or the "Cancel" button BT2 in the setting dialogue 100 (see FIG. 2) is pressed through the operation portion 13 by the user for determining whether or not the end of the display of the setting dialogue 100 is instructed.

When it is determined that the end of the display of the setting dialogue 100 is not instructed (NO at step S2), the invalidity setting item instruction detecting portion 11a determines whether or not a mouse pointer is moved onto a display area of a setting item corresponding to a function (step S3). At step S3, when it is determined that the mouse pointer is moved (in the case of YES), the invalidity setting item instruction detecting portion 11a determines whether or not the setting item is set to be valid (step S4).

When the setting item is not set to be valid at step S4 (in the case of NO; for example, the case where, when the mouse pointer is moved onto the display area f15 of the setting item "Punch Function" corresponding to the punch function in the setting dialogue 100 as shown in FIG. 2, the setting value "Non-Selected" is set in the setting value input field f16 and the punch function is set to be invalid), the procedure proceeds to step S5.

At step S5, the invalidity setting item instruction detecting portion 11a specifies a function corresponding to the indicated setting item (specifically, the setting item in the pointed display area). In the above-described example, the punch function is specified. Then, based on information of a mounted function and information of an MFP to be set currently, which are stored in the device information storage portion 12a, as well as information of the specified function, the device determination portion 11b determines whether or not the specified function is mounted in the MFP to be set.

When the specified function is unavailable in the MFP to be set (NO at step S5), the device determination portion 11b determines a device (MFP) mounted with the specified function and specifies a function mounted device, and then, the display control portion 11c displays a display part of an illustration of an MFP in which the specified function is available by animation, based on information of the specified function mounted device and the like (step S6) and the procedure proceeds to step S7. Of course, there is also a case where no MFP is mounted with the above-described function, and in such a case, the function mounted device can not be specified, thus the procedure returns to step S2 instead of proceeding to step S6 from step S5, description of which in the flowchart will be omitted.

At step S7, the control portion 11 determines whether or not the mouse pointer is moved from the setting item during the animation display, and the display control portion 11c performs the animation display until it is determined that the mouse pointer is moved at step S7, and after determination as such, the animation display is stopped (step S8). Thereafter, the procedure returns to step S2.

Note that, when the mouse pointer is not moved onto the display area of the setting item (NO at step S3) or when the setting item having the mouse pointer on the display area thereof is set to be valid (YES at step S4), the procedure directly returns to S2. In addition, also when the above-described specified function is available in the MFP to be set (YES at step S5), the procedure returns to step S2.

Further, when it is determined that the end of the display of the setting dialogue 100 is instructed at step S2 (in the case of YES), the present processing is finished.

Moreover, in the above-described example, as the method for displaying an illustration of a device in a different form, the animation display as described above has been performed. However, the above-described method for displaying in a different form is not limited to the above, and for example, a method described in FIG. 7A or FIG. 7B below or a method for simply increasing a size or performing a blink display of one illustration may be used.

Figure 7A:
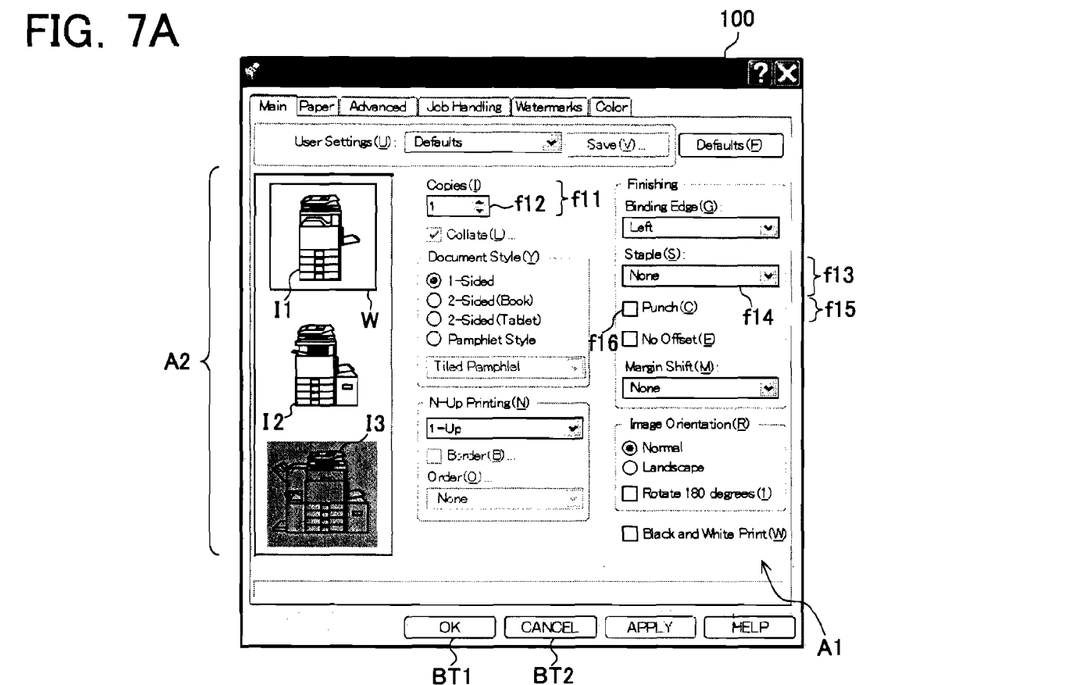
FIGS. 7A and 7B are views illustrating an example when an illustration of a predetermined device is displayed in a different form from that of others.

In the example of FIG. 7A, the display control portion 11c displays a background color of a display part of the illustration I3 of the MFP 40 that is specified as the function mounted device when the MFP 20 is a setting object, in a color deeper than that of a display part of the illustration I10 or I20 of the MFP 20 or the MFP 30 so as to be different from each other. Note that, the background color of the illustration has been differentiated, but a color of the illustration itself may be differentiated.

Figure 7B:
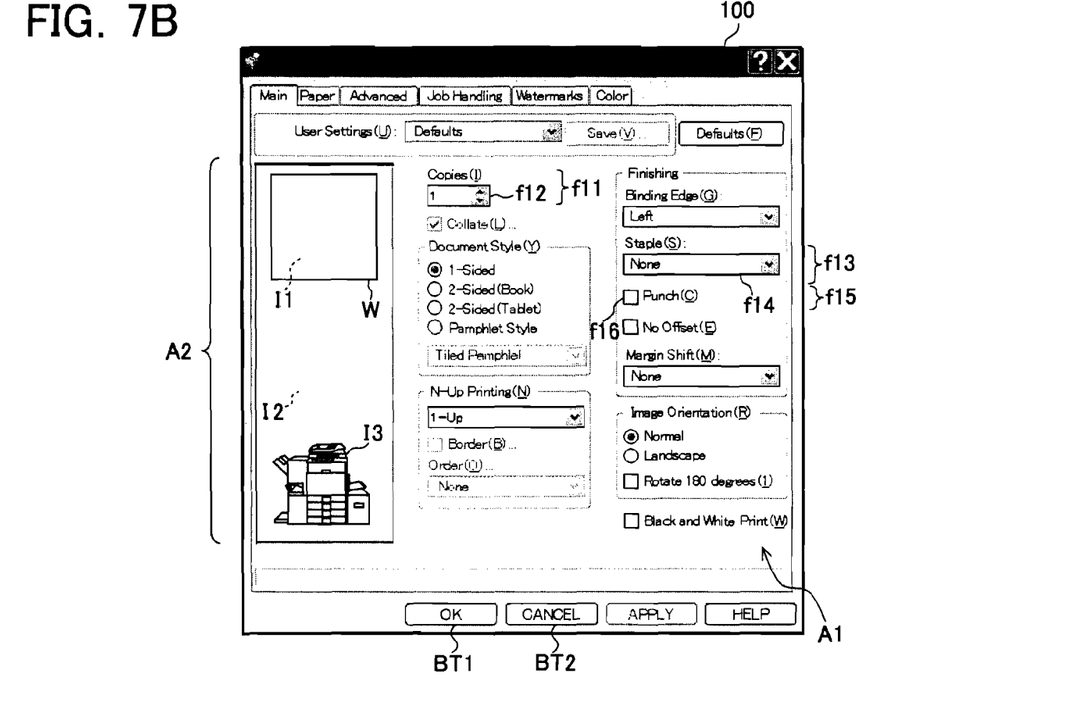

In the example of FIG. 7B, the display control portion 11c controls the display screen to delete (not to display) the illustrations I1 and I2 of the devices (MFPs 20 and 30) that are not specified as a function mounted device including a device to be set and displays only a device mounted with the function. Note that, the illustrations may not be deleted completely but be displayed in a light color differentially from others.

By performing the display as shown in FIGS. 7A and 7B, it is possible to obtain the similar effect to the case of the above-described animation display.

Since the display control is performed as described above, the user is capable of recognizing the case where a desired function is not mounted in a device (MFP) to be set, and for example, by performing a click operation to an illustration part displayed by animation or an illustration part having a different background color from others, it is possible to switch the MFP to be set to an MFP mounted with the function and perform printing with the function made valid.

In addition, when the MFP to be set is mounted with the desired function, the user is capable of recognizing that effect by a condition of the animation display and the like, thus, by performing an operation of setting a setting item corresponding to the function to be valid similarly to the general printer driver, it is possible to perform printing using the function. Note that, in order to easily notify the user that the function desired by the user is mounted in the MFP to be set, when an MFP to be set currently is mounted with the function specified by the invalidity setting item instruction detecting portion 11a, a display part of an illustration of the MFP may be displayed by animation by the display control portion 11c.

Note that, when the MFP to be set currently is not mounted with the function specified by the invalidity setting item instruction detecting portion 11a and when the setting item corresponding to the function specified by the invalidity setting item instruction detecting portion 11a is set to be valid, the MFP to be set may be automatically changed to the MFP which has been specified as the function mounted device and subjected to the animation display. In this case, in order to show the automatic change, it is preferable that the animation display be successively made over a fixed time. However, the control for the animation display here is performed optionally, and whether or not to perform the control may be decided depending on a setting.

In the above, description has been given for the embodiment in which, when a function that is desirably selected by the user is set to be invalid and a device to be set is not mounted with the function (when the setting item indicated by the user is set to be invalid and the device to be set is not mounted with the function), an illustration is displayed in a different form. In addition, as will be described in FIGS. 8 and 9 below, regardless of whether or not the setting item is set to be invalid or whether or not the device to be set is mounted with the function, an illustration of the device mounted with the function corresponding to the setting item may be displayed in a different form from the device not mounted with the function. In this case, processing executed by the control portion of the PC 10 may be changed.

Figure 8:
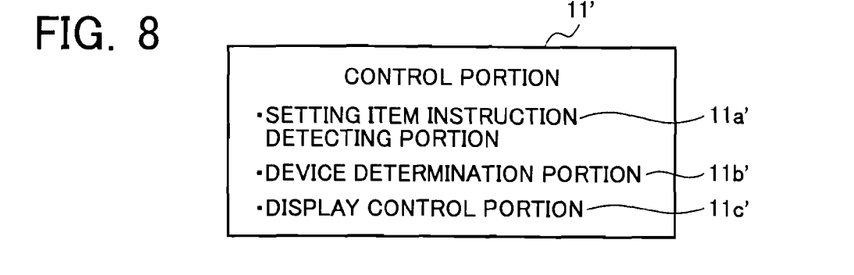
FIG. 8 is a view illustrating a control portion of an information processing apparatus according to another embodiment of the present invention.

FIG. 8 is a view illustrating a control portion of an information processing apparatus according to another embodiment of the present invention. The information processing apparatus (PC), except for a control portion, in this example is similar in configuration to the PC 10 of FIG. 1 and is therefore not shown in the figure, with description thereof omitted. A control portion 11' of the PC 10 in the present example has a setting item instruction detecting portion 11a', a device determination portion 11b', and a display control portion 11c'.

The setting item instruction detecting portion 11a' detects that a setting item corresponding to a function is indicated and specifies the function corresponding to the indicated setting item.

The device determination portion 11b' determines a device mounted with the function specified by the setting item instruction detecting portion 11a' and specifies the device as a function mounted device (in this case, a device to be set can be selected as the function mounted device).

The display control portion 11c' performs control so that respective illustrations of a plurality of devices are displayed within a setting dialogue box, in particular, an illustration of the device specified as the function mounted device by the device determination portion 11b' is displayed in a different form from illustrations of other devices. The display in a different form by the display control portion 11c' includes the animation display as shown in FIGS. 5A through 5C, and the display with a background color made different and the display of only an illustration of the function mounted device as shown in FIGS. 7A and 7B.

Just by performing such a simple display control, a user is capable of recognizing a device mounted with the desired function, and for example, when an illustration of a device to be set is not displayed, by performing a click operation to the illustration part of the device where the illustration is displayed, it is possible to switch the MFP to be set to the MFP mounted with the desired function and to perform printing with the desired function made valid.

Figure 9:
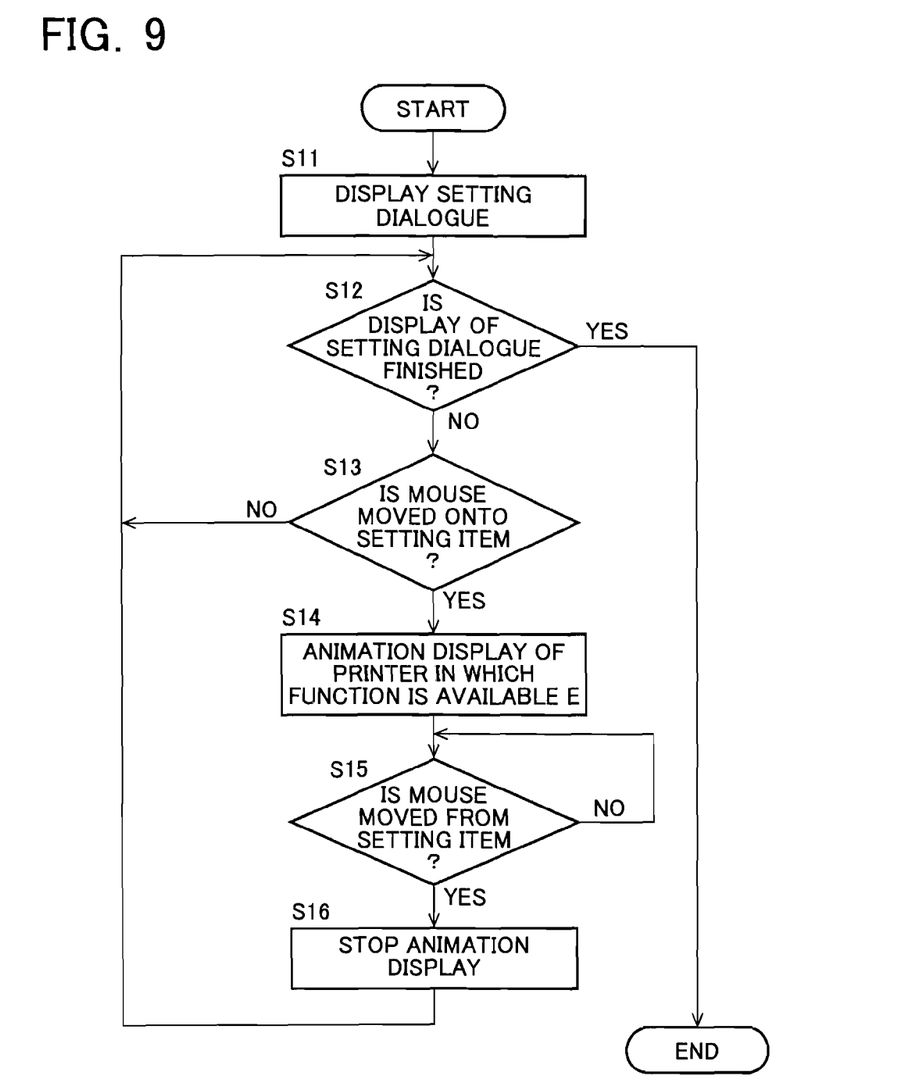
FIG. 9 is a flowchart illustrating an example of display processing for a setting dialogue of the present invention.

FIG. 9 is a flowchart illustrating an example of display processing for a setting dialogue by the PC 10 provided with the control portion 11'. Steps S11 to S13 are similar to steps S1 to S3 in FIG. 6, respectively, thus description thereof will be omitted.

When it is determined that a setting item is indicated at step S13, that is, when it is determined that a mouse pointer is moved onto a display area of the setting item corresponding to a function (in the case of YES), the procedure proceeds to step S14.

At step S14, the setting item instruction detecting portion 11a' specifies a function corresponding to the indicated setting item (specifically, the setting item in the pointed display area). Then, the device determination portion 11b' determines a device (MFP) mounted with the specified function based on mounted function information and information of the specified function stored in the device information storage portion 12a, and specifies a function mounted device, and thereafter, the display control portion 11c' controls the display screen to display a display part of an illustration of the MFP in which the specified function is available by animation in the setting dialogue, based on the information of the specified function mounted device and the like, and the procedure proceeds to step S15. Subsequently, processing at steps S15 and S16 and the like are performed, and the present processing is finished.

Steps S15 and S16 are similar to steps S7 to S8 in FIG. 6, respectively, thus description thereof will be omitted.

Note that, in this example, a device to be set may not be specified in advance, and a device to be set may be specified by a user before pressing the "OK" button to make a printing instruction and the like.

Reference Example

In the above, description has been given for the embodiment when a function is intended to be selected, that is, when a setting item corresponding to a function is indicated by a pointer. In addition, as will be described in FIGS. 10 and 11 below, the display in a different form as described above may be performed in order to notify a user, when the setting item is actually set to be valid, of a device suitable for printing using the function. Note that, in this example, before the setting item corresponding to the function is selected, a device to be set is not specified.

Figure 10:
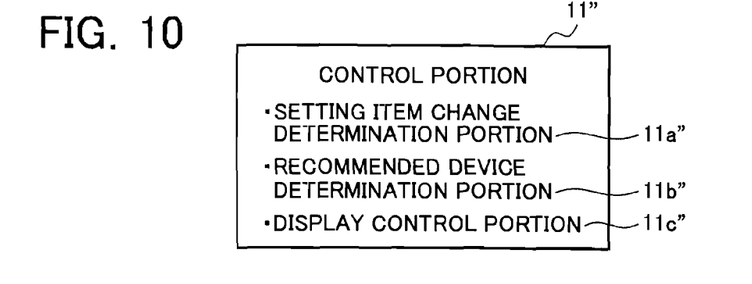
FIG. 10 is a view illustrating a control portion of an information processing apparatus according to a reference example of the present invention.

FIG. 10 is a block diagram illustrating a control portion of an information processing apparatus according to the reference example. The information processing apparatus (PC), except for a control portion, in this example is similar in configuration to the PC 10 of FIG. 1 and the like, and is therefore not shown in the figure, with description thereof omitted. A control portion 11" of the PC 10 in the present example has a setting item change determination portion 11a", a recommended device determination portion 11b", and a display control portion 11c".

The setting item change determination portion 11a" determines whether or not a setting item corresponding to a function (at least a setting item corresponding to a function, the mounted state or the like of which can be different for each device) is changed, and when being changed, the setting item change determination portion 11a" specifies a function corresponding to the setting item that is set to be valid.

The recommended device determination portion 11b" determines a device mounted with the function specified by the setting item change determination portion 11a" and specifies the device as a recommended device (function mounted device).

The display control portion 11c" performs control so that respective illustrations of a plurality of devices are displayed within a setting dialogue box, in particular, an illustration of the device specified as the recommended device by the recommended device determination portion 11b" is displayed in a different form from illustrations of other devices. The display in a different form by the display control portion 11c" includes the animation display as shown in FIGS. 5A through 5C, the display with a background color made different and the display of only an illustration of a function mounted device as shown in FIGS. 7A and 7B.

By performing the display control in this way, a user is capable of determining an available and optimum device at a glance. In addition, when the user confirms the optimum device and thereafter specifies the device as a device to be set and makes an instruction for printing, the user is capable of performing the printing smoothly.

Figure 11:
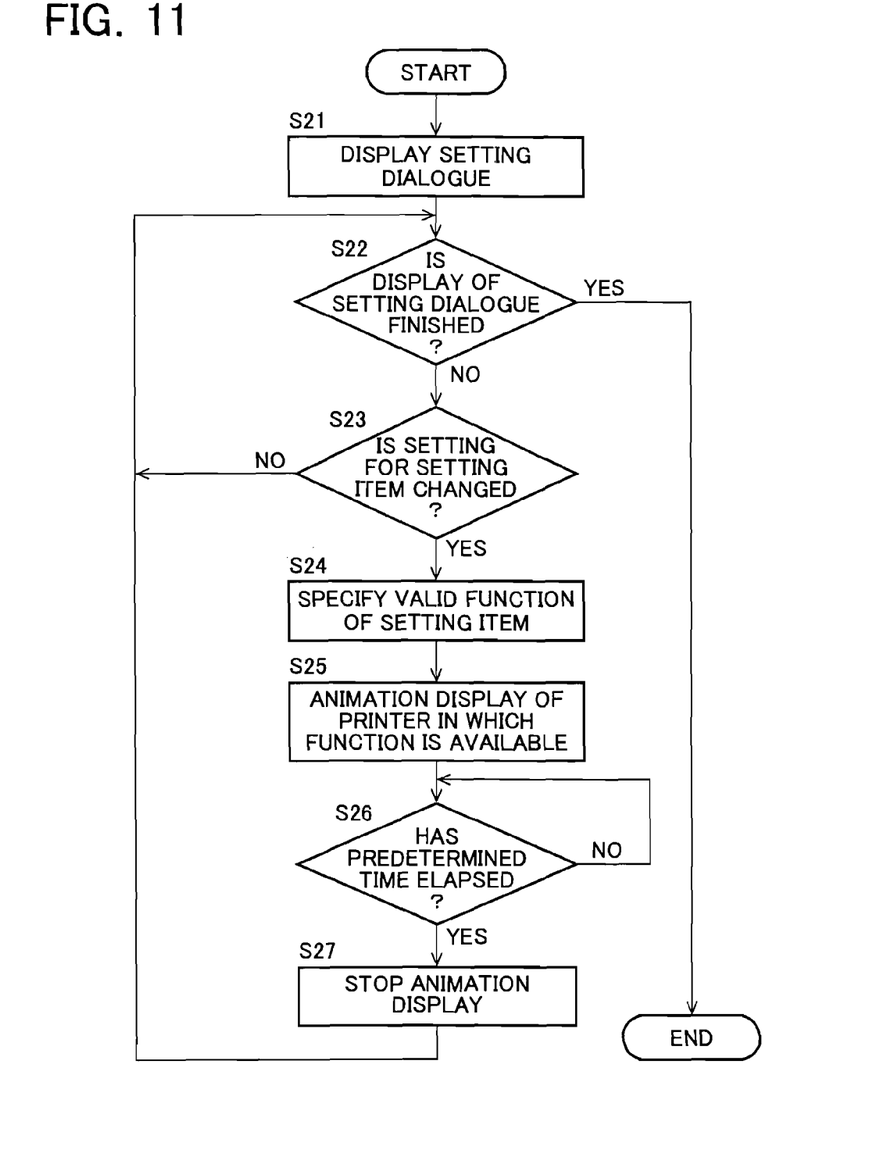
FIG. 11 is a flowchart illustrating an example of display processing for a setting dialogue according to the reference example of the present invention.

FIG. 11 is a flowchart illustrating an example of display processing for a setting dialogue according to the reference example. Steps S21 and S22 are similar to steps S1 to S2 in FIG. 6, respectively, thus description thereof will be omitted.

When it is determined that the end of the display of the setting dialogue 100 is not instructed at step S22 (in the case of NO), the setting item change determination portion 11a" determines whether a setting item corresponding to a function is changed from invalid to valid or from valid to invalid (step S23). The determination is performed, for example, based on whether or not an operation of checking or unchecking the check box f16 in the display area f15 relating to the setting item "Punch" in the setting dialogue 100 of FIG. 2 is performed.

When it is determined as being changed at step S23 (in the case of YES), the setting item change determination portion 11a" specifies a function corresponding to the setting item that is set to be valid with reference to the setting value storage portion 12b (step S24), and the procedure proceeds to step S25. For example, when it is determined that the setting item corresponding to the punch function is changed to be valid at step S23, only the punch function is specified or the punch function and the staple function are specified depending on the previous selection condition at step S24. In addition, while the punch function and the staple function are set to be valid in advance, when the punch function is changed to be invalid (non-selected), only the staple function is specified at step S24.

At step S25, based on mounted function information and function information stored in the device information storage portion 12a, the recommended device determination portion 11b" determines a device (MFP) mounted with the specified function and specifies a recommended device. Then, the display control portion 11c" controls the display screen to display a display part of an illustration of a device (MFP) in which the specified function is available by animation in the setting dialogue, based on information of the specified recommended device and the like, and the procedure proceeds to step S26. Of course, there is also a case where no MFP is mounted with the above-described function, and in such a case, it is impossible to specify a recommended device, thus the procedure returns to step S22 instead of proceeding to step S25 from step S24, description of which in the flowchart will be omitted.

At step S26, the control portion 11" determines whether or not a predetermined time has elapsed after the animation display was started, and the display control portion 11c" performs the animation display until it is determined that a predetermined time has elapsed at step S26, and after determined as such, the animation display is stopped (step S27). Thereafter, the procedure returns to step S22.

Note that, when the setting item corresponding to the function is not changed (NO at step S23), the procedure directly returns to step S22.

When it is determined that the end of the display of the setting dialogue 100 is instructed at step S22 (in the case of YES), the present processing is finished.

By performing such display processing, even after the user selects the function to be desirably carried out, it is possible to grasp a device that has the function accurately and select the appropriate device for printing.

In the above, the reference example has been given assuming that a device to be set is not specified, but may be specified, and in such a case, when the device to be set has the function specified by the setting item change determination portion 11a", the display of an illustration may not be performed in a different form.

By performing the display processing like in the above-described three examples, it is possible, before setting of a function desired by a user to a device, to notify the user of a device mounted with the function, thus making it possible to reduce the labor on the user in printing using the function.

Moreover, by displaying the schematic overview of a device as an illustration of the device displayed in the setting dialogue like in the above-described three examples, the user grasps the overview of the device as well as an installed position and the like, thus the user is capable of determining whether or not to set the function to be valid based on the illustration. In addition, by performing the display, the user is capable of seeing intuitively which MFP has ejected a printed matter, thus making it possible to save the labor to find which MFP has performed the printing in each case. Note that, the illustration showing the schematic overview of the device preferably reflects the mounted condition of option units of respective devices, and when the devices are different from one another, the characteristics of the devices is desired to be picked up in the illustration.

In the above-described example, the illustration display area in the setting dialogue has displayed only illustrations of MFPs, but may display information of installed positions of the MFPs together. In order to achieve this, an installed position for each MFP is stored in the device information storage portion 12a and the stored installed position is read out when the setting dialogue is displayed. In this way, by displaying information of installed positions of MFPs and the like together, the user is capable of determining whether or not to set the function to be valid based on the information of installed position.

In addition, in the above-described example, the illustrations of the MFPs have been different from one another, but the same illustration of the MFP may be used. In this case, in order to notify that which printer has a corresponding function in the animation display, the information of the installed position, a printer name or the like is displayed together with the illustration.

Moreover, presence of toners, a condition of sheets, failure information such as jam, a condition of accumulated jobs, or the like may be displayed together with the illustration.

Furthermore, when a plurality of MFPs have a function specified by the setting item instruction detecting portion 11a, the setting item instruction detecting portion 11a', or the setting item change determination portion 11a", the animation display may be made for only one MFP, for example, based on a setting (priority order) predetermined by the user.

Furthermore, since there is also a case where, even when a device is mounted with a specified function, the device can not execute the function depending on the condition, the device determination portion 11b, the device determination portion 11b', or the recommended device determination portion 11b" may perform specification of a function mounted device or a recommended device, and the like, based on condition information (information of presence of staple and the like) of settable devices (MFPs 20, 30 and 40).

Note that, the present invention will not be limited to the above-described contents, and alterations can be made as appropriate within the scope of the present invention. For example, the present invention is applicable not only to a printer driver, but to various software having a UI such as a scanner driver, a PC-FAX driver, and general applications.

According to the present invention, the following effect can be obtained.

According to the present invention, it is possible, before setting of a desired function by a user to a device, to notify the user of a device mounted with the function, thus making it possible to reduce the load on the user in printing using the function.

The invention claimed is:

1. An information processing apparatus that displays, in order to perform an operation setting for each of functions of a plurality of devices which are communicatively connected, a setting dialogue box in which at least one setting item corresponding to each of the functions is provided, and that has a pointer for instructing at least one setting value corresponding to the at least one setting item, comprising:

a display control portion configured to display illustrations of the plurality of devices in the setting dialogue box;

a mounted function storage portion configured to store a mounted function for each of the devices;

a detecting portion configured to detect when the pointer is moved over at least one setting item; and a determination portion configured to determine that one or more devices are mounted with a function corresponding to the setting item detected by the detecting portion, wherein the display control portion performs an animation of a schematic image, of each of the one or more devices of the plurality of devices, that are able to perform the function corresponding to the setting item detected while the pointer is over the detected setting item, and wherein other schematic images of the devices which are not able to perform the function corresponding to the setting item detected are not animated.

2. The information processing apparatus as defined in claim 1, wherein a size of the illustration is gradually changed in the animation display.

3. The information processing apparatus as defined in claim 1 or 2, wherein, once the pointer is removed from over top of the setting item, the animation display is stopped.

* * * * *